(12) United States Patent
Ogawa et al.

(10) Patent No.: US 8,468,243 B2
(45) Date of Patent: Jun. 18, 2013

(54) BASE STATION APPARATUS FOR DISTRIBUTING CONTENTS AND TERMINAL APPARATUS FOR RECEIVING THE CONTENTS

(75) Inventors: Kazuya Ogawa, Mizuho (JP); Shen Haoming, Ichinomiya (JP); Yoko Tanaka, Mizuho (JP)

(73) Assignee: Hera Wireless S.A., Luxembourg (LU)

( * ) Notice: Subject to any disclaimer, the term of this patent is extended or adjusted under 35 U.S.C. 154(b) by 605 days.

(21) Appl. No.: 12/343,901

(22) Filed: Dec. 24, 2008

(65) Prior Publication Data

US 2009/0177759 A1 Jul. 9, 2009

(30) Foreign Application Priority Data

Dec. 26, 2007 (JP) .................................. 2007-335290
Dec. 26, 2007 (JP) .................................. 2007-335291

(51) Int. Cl.
*G06F 15/173* (2006.01)

(52) U.S. Cl.
USPC ........... 709/225; 709/201; 709/202; 709/224; 709/231

(58) Field of Classification Search
USPC .......................... 709/225, 201, 202, 224, 231
See application file for complete search history.

(56) References Cited

U.S. PATENT DOCUMENTS

| 2004/0127221 A1* | 7/2004 | Takano et al. .................. 455/445 |
| 2004/0147267 A1* | 7/2004 | Hill et al. .................... 455/456.1 |
| 2008/0008112 A1* | 1/2008 | Lee ................. 370/312 |
| 2008/0062929 A1* | 3/2008 | Leonidov et al. ............. 370/331 |
| 2010/0317390 A1* | 12/2010 | Rekimoto ...................... 455/511 |
| 2011/0003608 A1* | 1/2011 | Forenza et al. ............... 455/501 |

FOREIGN PATENT DOCUMENTS

| JP | 2005-006285 A | 1/2005 |
| JP | 2007-005892 | 1/2007 |
| JP | 2007-013649 A2 | 1/2008 |

OTHER PUBLICATIONS

A Japanese office action issued on Feb. 21, 2012 in a counterpart Japanese patent application.
Office action issued on Apr. 2, 2013, in the counterpart Japanese patent application.

* cited by examiner

*Primary Examiner* — Lan-Dai T Truong
(74) *Attorney, Agent, or Firm* — DC Patent Lawyers, PLLC

(57) ABSTRACT

A content transmitter distributes contents. An update information management unit manages update information on the update of the contents distributed by the content transmitter. An identifier generator generates notifying identifiers containing the update information managed by the update information management unit. The update information contains the update time of each content or a time period until each content is updated. A beacon transmitter transmits, as beacon, the notifying identifiers generated by the identifier generator.

10 Claims, 9 Drawing Sheets

FIG.2

| CHANNEL | VERSION |
|---------|---------|
| 0 1 | 0 2 3 |
| 0 2 | 0 1 3 |
| 0 3 | 0 0 8 |

FIG.6

| CHANNEL | VERSION | ESTIMATED TIME OF NEXT UPDATE |
|---|---|---|
| 0 1 | 0 2 3 | 15:30:00 |
| 0 2 | 0 1 3 | 15:29:20 |
| 0 3 | 0 0 8 | 17:30:00 |

BASE STATION APPARATUS FOR DISTRIBUTING CONTENTS AND TERMINAL APPARATUS FOR RECEIVING THE CONTENTS

CROSS-REFERENCE TO RELATED APPLICATIONS

This application is based upon and claims the benefit of priority from the prior Japanese Patent Applications No. 2007-335290, filed Dec. 26, 2007, and Japanese Patent Application No. 2007-335291, filed Dec. 26, 2007, the entire contents of which are incorporated herein by reference.

BACKGROUND OF THE INVENTION

1. Field of the Invention

The present invention relates to a base station apparatus for distributing contents and a terminal apparatus for receiving the contents.

2. Description of the Related Art

In recent years, contents distribution using wireless LAN (Local Area Network) is in wide use. As wireless LAN gets faster, the distribution services for videos are in practical use.

In order for a terminal apparatus to recognize, in wireless LAN, whether the contents that a terminal apparatus side intends to receive is being distributed from a base station apparatus or not, information as to services that the base station apparatus presents must be acquired. To that end, the terminal apparatus needs to establish the connection to the base station apparatus and then requests the base station apparatus to send the information. That is, the information cannot be acquired unless the terminal apparatus is connected to the base station apparatus. In so doing, if the base station apparatus is not distributing the contents that the terminal apparatuses wishes to receive, there is no need to retain the connection to the base station apparatus and therefore the connection is disconnected.

As described above, to check the services that the base station apparatus offers, it is necessary that the terminal apparatus periodically accesses the base station apparatus and acquires information on the service such as information as to whether the content has been updated or not. If, however, there is no change in the service, this connection processing will be wasted.

SUMMARY OF THE INVENTION

A base station apparatus according to one embodiment of the present invention comprises: a content transmitter which distributes a content; an update information management unit which manages update information on the content distributed by the content transmitter; an identifier generator which generates a notifying identifier containing the update information managed by the update information management unit; and a beacon transmitter which transmits, as beacon, the notifying identifier generated by the identifier generator.

Optional combinations of the aforementioned constituting elements, and implementations of the invention in the form of methods, apparatuses, systems, recording mediums, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 2 shows an example of update information, according to a first embodiment of the present invention, which is contained in a connecting identifier and is to be transmitted to a terminal apparatus;

FIG. 6 shows an example of update information, according to a second embodiment of the present invention, which is contained in a connecting identifier and is to be transmitted to a terminal apparatus;

DETAILED DESCRIPTION OF THE INVENTION

The invention will now be described by reference to the preferred embodiments. This does not intend to limit the scope of the present invention, but to exemplify the invention.

Figure 1:
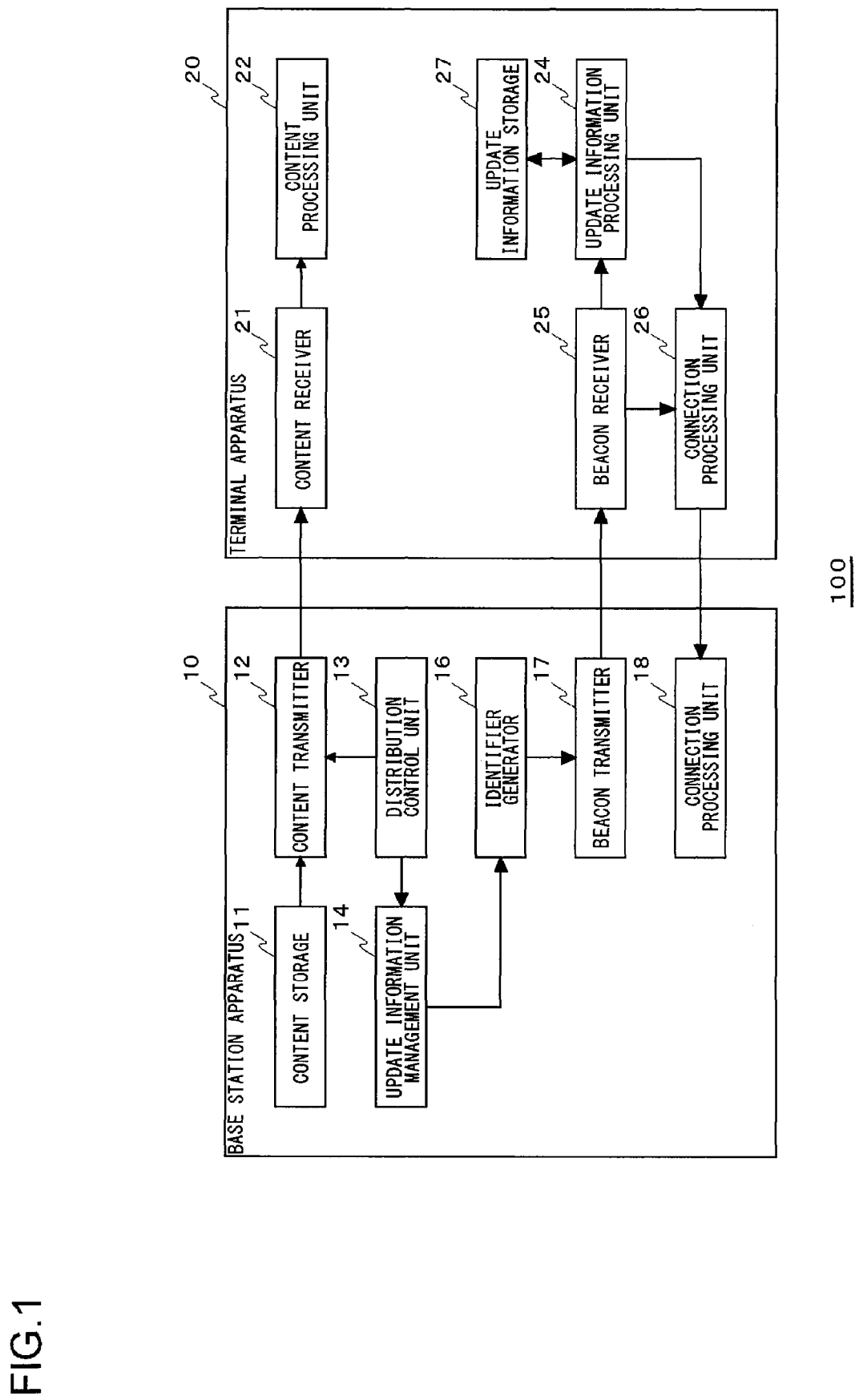
FIG. 1 is a block diagram showing a structure of a communication system according to a first embodiment of the present invention.

FIG. 1 is a block diagram showing a structure of a communication system 100 according to a first embodiment of the present invention. The communication system 100 includes a base station apparatus 10 and a terminal apparatus 20. The base station apparatus 10 is an access point that constitutes wireless LAN, and distributes contents receivable and reproducible by the terminal apparatus 20. This distribution may be either multicast distribution or unicast distribution. The contents may contain at least one of texts, still images, moving images, audio, metadata and the like. Assume in the following description that the base station apparatus 10 is installed in a commercial premise such as a convenience store and distributes the contents to within the store or its neighboring premises by multicast. For example, advertisement images or coupons are distributed as the contents.

Though the base station apparatus 10 distributes the contents, the contents distributed may change. The base station apparatus 10 sets a connecting identifier and a notifying identifier and transmits them as beacons. SSID (Service Set Identifier) may be used as these identifiers. The connecting identifier is an identifier used to connect the base station apparatus 10 and the terminal apparatus 20. The notifying identifier, which contains information on update conditions of the contents to be distributed (hereinafter referred to as "update information"), is an identifier used to convey the information from the base station apparatus 10 to the terminal apparatus 20. The update information will be discussed later in detail.

The terminal apparatus 20 is a terminal capable of receiving and reproducing the above-described contents after the terminal apparatus 20 has been connected to the base station apparatus 10. The terminal apparatus 20 corresponds to a mobile phone, a smart phone, a notebook PC, a dedicated terminal and the like, for instance. If the content that the terminal apparatus 20 intends to receive is not being distributed, the terminal apparatus 20 disconnects the connection to the base station apparatus 10. The terminal apparatus 20 periodically receives the notifying identifier transmitted from the base station apparatus 10 and determines if a connection is required or not, based on the aforementioned update information contained in the notifying identifier. As a result, the terminal apparatus 20 eliminates establishing unnecessary connections, so that power consumption can be reduced. In a second embodiment discussed later, instead of periodically receiving the notifying identifier sent from the base station apparatus 10, the terminal apparatus 20 receives it with proper timing.

A detailed description is given hereinbelow of structures of the base station apparatus 10 and the terminal apparatus 20.

The base station apparatus 10 includes a content storage 11, a content transmitter 12, a distribution control unit 13, an update information management unit 14, an identifier generator 16, a beacon transmitter 17, and a connection processing unit 18.

The terminal apparatus 20 includes a content receiver 21, a content processing unit 22, an update information processing unit 24, a beacon receiver 25, a connection processing unit 26, and an update information storage 27.

The structural components of the base station apparatus 10 and the terminal apparatus 20 may be implemented hardware-wise by elements such as a CPU, memory and other LSis of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only or a combination of hardware and software.

Each structural component of the base station apparatus 10 is first described.

The content storage 11 stores the contents that the base station apparatus 10 distributes. The contents stored in the content storage 11 may be acquired from other equipment via a network or from predetermined media (not shown) or the like. The contents stored in the content storage 11 is distributed by the content transmitter 12.

The content transmitter 12 distributes the contents stored in the content storage 11, according to instructions from the distribution control unit 13.

The distribution control unit 13 determines contents which are to be distributed from the content transmitter 12. The distribution control unit 13 determines the contents which are to be distributed, based on distribution schedule information.

Here, the distribution schedule information is information indicating the schedule of contents distributed from the content transmitter 12. The distribution schedule information contains stream IDs, address information, distribution time, and content information. The stream ID is identification information used to identify a content distribution. The address information is information required for the receiving of the content. The distribution time contains distribution start time and distribution end time. The content information contains content IDs and content names.

At the distribution start time or distribution end time indicated in the distribution schedule information, the distribution control unit 13 instructs the content transmitter 12 to start or terminate the distribution of the content according to the information. At the same time, update information stored in the update information management unit 14 is updated.

Also, the distribution control unit 13 may determine the contents which are to be distributed, based on change instruction information instead of the distribution schedule information.

This change instruction information is information generated when a change in the content which is being distributed is instructed by a control module or operation unit. In other words, the change instruction information is the information excluding modified time from change schedule information.

When the change instruction information is generated, the distribution control unit 13 instructs the content transmitter 12 to change the distribution content according to the information. At the same time, the distribution control unit 13 updates the update information stored in the update information management unit 14.

The update management unit 14 manages the update information. More specifically, the update management unit 14 updates the update information according as the contents distributed from the content transmitter 12 vary. The update information may contain information on a version. The version may indicate the number of times that the distribution content has been modified. In such a case, the arrangement may be such that the number of times is incremented by 1 every time the distribution content is updated and the count returns to 1 if it overflows. The update information stored in the update information management unit 14 is updated by the distribution control unit 13 and is referenced by the identifier generator 16.

The identifier generator 16 generates a notifying identifier that contains the update information managed by the update management unit 14. More specifically, the identifier generator 16 generates the notifying identifier in such a manner that the update information stored in the update information management unit 14 is associated with the identification information used to identify the distribution of contents. The notifying identifier thus generated is sent to the beacon transmitter 17 where the notifying identifier is transmitted as beacon.

The beacon transmitter 17 transmits the notifying identifiers generated by the identifier generator 16 as beacons. The connecting identifiers may be transmitted as beacons. The beacons transmitted are received by the terminal apparatuses 20.

The connection processing unit 18 performs connection processing between the base station apparatus 10 and a terminal apparatus 20, in response to a connection (access) request sent from the terminal apparatus 20. More specifically, the connection processing unit 18 establishes a connection with the terminal apparatus 20 that has made a connection request by conveying the connecting identifier thereto. The connection processing unit 18 rejects the connection request made by a terminal apparatus 20 which has not informed the connecting identifier, and does not perform connection processing on said terminal apparatus 20. In other words, the connection request using the notifying identifier generated by the identifier generator 16 is rejected, and the connection request using a preset connecting identifier different from the aforementioned notifying identifier is granted.

It is to be noted that the base station apparatus 10 can distribute a plurality of different contents simultaneously. That is, the content transmitter 12 distributes a plurality of contents in parallel. In so doing, the update information is set for each distribution of a content. The update information management unit 14 manages the update information in such a manner that the identification information used to identify each content distribution is related to the corresponding update information. The identifier generator 16 generates the notifying identifiers in such a manner that a plurality of pieces of identification information are related to their corresponding update information. The beacon transmitter 17 transmits them as beacons.

Next, each structural component of the terminal apparatus 20 is described.

The content receiver 21 receives contents distributed from the base station apparatus 10. The received contents are transmitted to the content processing unit 22.

The content processing unit 22 reproduces the contents received by the content receiver 21.

The beacon receiver 25 receives beacon transmitted from the base station apparatus 10. A notifying identifier contained in the beacon is outputted to the update information processing unit 24. If a connecting identifier is contained in this beacon, the connecting identifier will be outputted to the connection processing unit 26. However, a method for setting the connecting identifier is not limited to an example where the connecting identifier is set to the connection processing unit 26 through such a process described above. For example, the connecting identifier may be set as follows. That is, when an application necessary for the reproduction of the distributed contents is downloaded, the connecting identifier may be set; or the connecting identifier may be manually inputted by a user, or may be set by using other methods.

The update information processing unit 24 acquires update information from the connecting identifier received by the beacon receiver 25. Then the acquired update information is compared with the update information stored in the update information storage 27, so that whether there is a stream which has been updated or not is determined. More specifically, the update information of a stream, to be received by the terminal apparatus 20, which is stored in the update information storage 27 is compared with the update information, corresponding to this stream, which is contained in the notifying identifier. If they do not agree, a connection to the base station apparatus 10 is requested to the connection processing unit 26. If a plurality of streams are being distributed and update information corresponding to the plurality of streams is conveyed and only if there is any change in the update information stored in the update information storage 27, namely the update information on streams which are to be received and reproduced, the connection to the base station apparatus 10 will be requested to the connection processing unit 26. Even if there is any change in the update information on the other streams, the connection request will not be made.

The update information storage 27 stores update information. This update information is basically the same as the update information that the update information management unit 14 in the base station apparatus 10 stores. However, only the update information on the streams to be received and reproduced by the terminal apparatus 20 is stored here in the update information storage 27. This update information is referenced by the update information processing unit 24.

The connection processing unit 26 makes a connection request to the base station apparatus 10 in response to a request from the update information processing unit 24. The above-described connecting identifier is required for this connection request.

Figure 2:
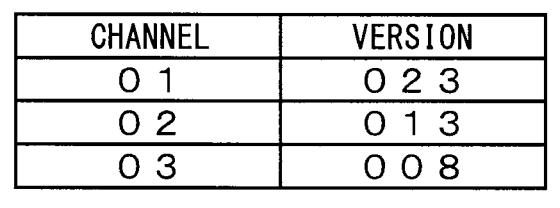

FIG. 2 shows an example of update information, according to the first embodiment of the present invention, which is contained in a connecting identifier and is to be transmitted to the terminal apparatus 20.

The identifier generator 16 generates a notifying SSID of "Version__01:023__02:013__03:008" based on the update information of three channels shown in FIG. 2. The header, namely "Version", indicates that this notifying SSID is a notification about the update information. The subsequent part, namely "01:023", indicates that the channel is 1 and the version (the number of updates) is 23. "02:013" indicates that the channel is 2 and the version is 13, and "03:008" indicates that the channel is 3 and the version is 8. Here, "channel" is assigned for each of a plurality of streams.

The update information processing unit 24 compares the version contained in the connecting SSID received earlier with the connecting SSID received this time. If the version, which indicates the number of updates, received currently has increased over that received earlier, it can be determined that the content distributed from the base station 10 has been updated.

An operation of the communication system 100 according to the first embodiment will now be described.

Figure 3:
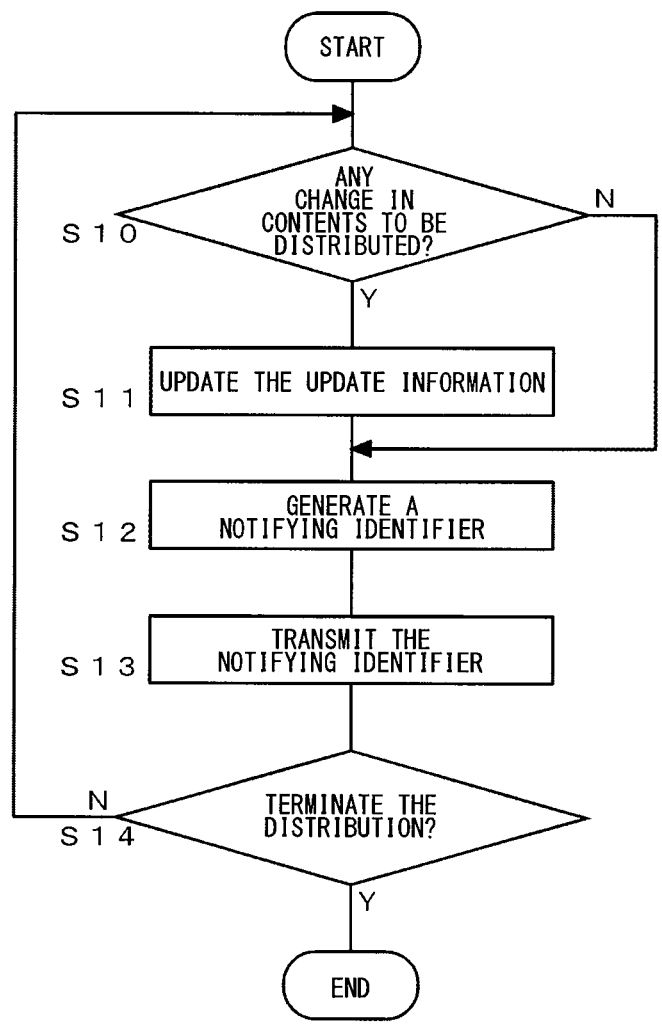
FIG. 3 is a flowchart showing schematically an operation of a base station apparatus according to a first embodiment of the present invention.

FIG. 3 is a flowchart showing schematically an operation of the base station apparatus 10 according to the first embodiment.

The distribution control unit 13 determines whether there is any change in the contents to be distributed from the content transmitter 12 or not (S10). If there is a change in the content (Y of S10), the update information stored in the update information management unit 14 will be updated (S11). If no change is made in the contents (N of S10), Step S11 will be skipped.

The identifier generator 16 generates a notifying identifier based on the update information stored in the update information management unit 14 (S12). The beacon transmitter 17 transmits the thus generated notifying identifier as beacon (S13). These processings continue by returning repeatedly to Step 10 until the distribution is terminated (Y of S14).

In addition, the base station apparatus 10 transmits the connecting identifier, distributes the contents, performs connection processing between the base station apparatus 10 and terminal apparatuses 20 and also carries out other processings but the description thereof is omitted here.

Figure 4:
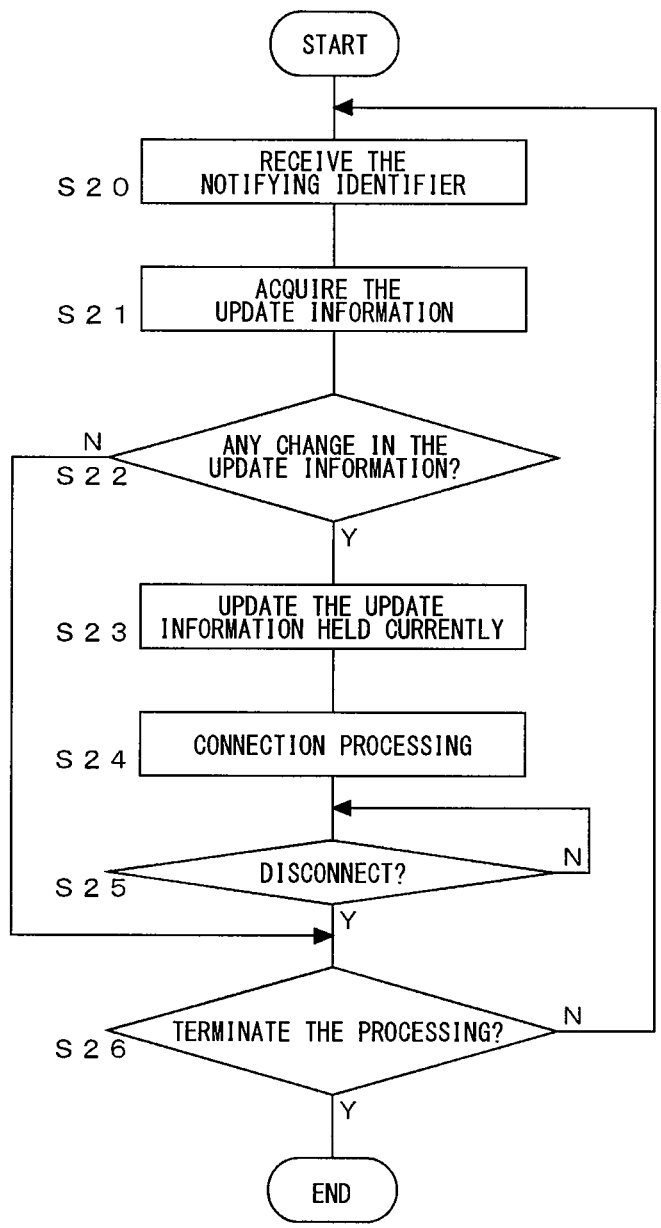
FIG. 4 is a flowchart showing schematically an operation of a terminal apparatus according to a first embodiment of the present invention.

FIG. 4 is a flowchart showing schematically an operation of the terminal apparatus 20 according to the first embodiment of the present invention.

The beacon receiver 25 receives a notifying identifier contained in the beacon (S20). The update information processing unit 24 acquires update information contained in this notifying identifier (S21).

Then the update information processing unit 24 compares the update information contained in this notifying identifier with the update information stored in the update information storage 27 so as to determine whether the content of a channel to be received has been updated or not (S22). More specifically, whether there is any difference in version between both the update information or not is determined. If not updated (N of S22), skip the processings of Steps S23 to S25 and proceed to Step S26. If updated (Y of S22), the update information stored in the update information storage 27 will be updated with the update information received (S23).

The connection processing unit 26 conveys the connecting identifier to the base station apparatus 10 and establishes connection with the base station apparatus 10 (S24). The content receiver 21 receives the contents distributed from the base station apparatus 10. Thereafter, as the connection is discontinued (Y of S25), proceed to Step S26. In Step S26, whether the whole processing is to be terminated or not is determined (S26) and if the processing is not to be terminated (N of S26), the processing of Step 20 onward will be repeated.

By employing the above-described first embodiment, whether the contents that the base station apparatus 10 provides have been updated or not can be determined without establishing connection between the terminal apparatus 20 and the base station apparatus 10. Thus, wasteful connection processing from the terminal apparatus 20 toward the base station apparatus 10 can be suppressed. That is, the terminal apparatus 20 is allowed to access the base station apparatus 10 only when the distribution content has been updated.

The base station apparatus 10 can restrict the access made from terminal apparatuses incompatible with the communication system 100 in a manner that the connection request using a notifying identifier from a terminal apparatus 20 is rejected and only the connection request using an unsent connecting identifier is granted. As a result, fee-based service or membership service can be easily built.

Figure 5:
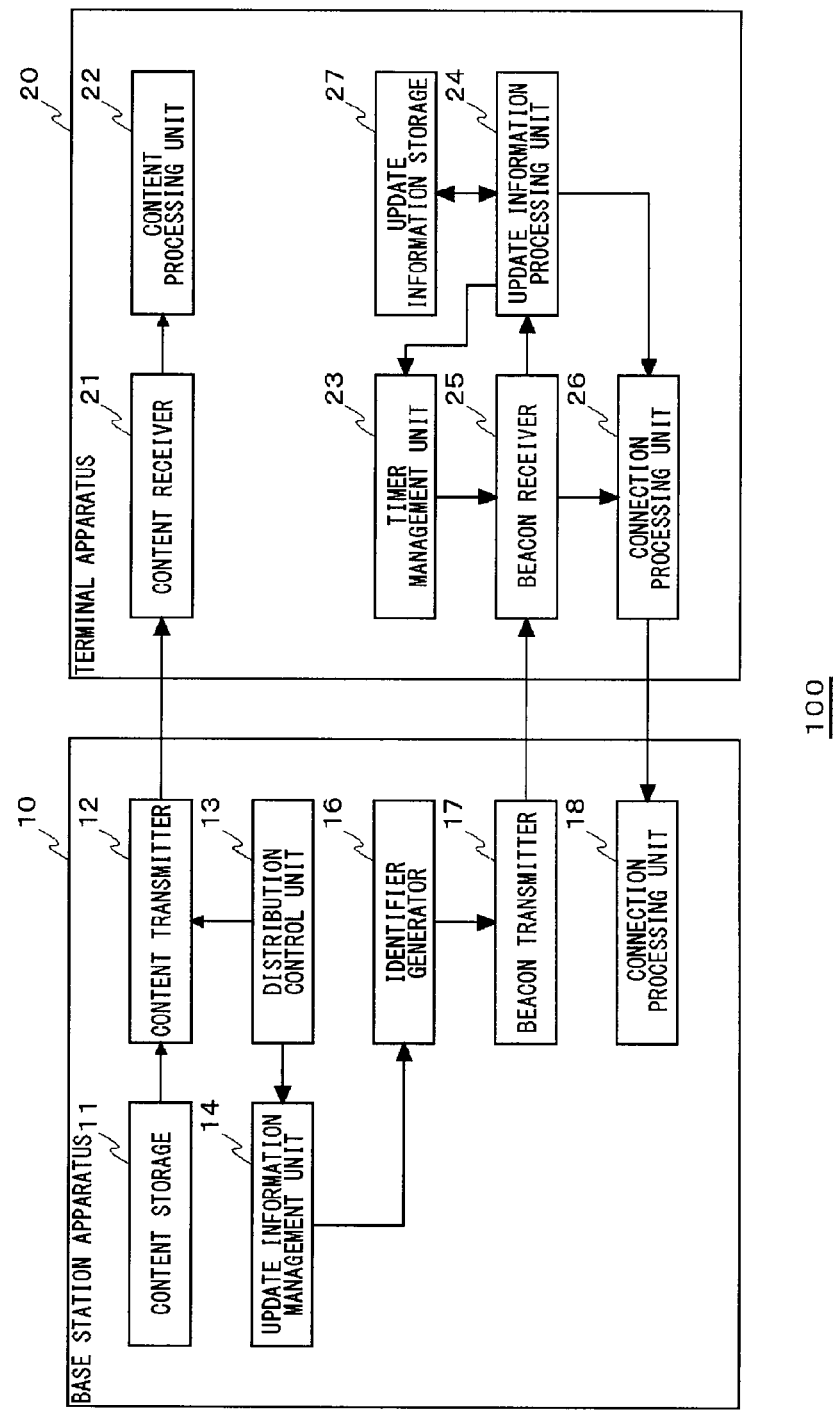
FIG. 5 is a block diagram showing a structure of a communication system according to a second embodiment of the present invention.

FIG. 5 is a block diagram showing a structure of a communication system 100 according to the second embodiment of the present invention. The basic structure and the basic operation of the communication system 100 according to this second embodiment are similar to those of the first embodiment. Differences from the first embodiment will now be described.

In the second embodiment, the update information stored in the update information management unit 14 contains the estimated time of the next update or a time duration till the next update of a content to be updated. Here, the time duration till the next update indicates a period of time between the time when beacon has been sent from the base station apparatus 10 and the actual time of update. Note that the time when beacon has been sent from the base station apparatus 10 is practically the same as the time when the beacon is received.

The structure of the terminal apparatus 20 according to the second embodiment is that of the terminal apparatus 20 according to the first embodiment added with a timer management unit 23.

The update information processing unit 24 sets the estimated time of the next update or the time duration till the next update contained in the acquired update information, to the timer management unit 23. Note that when the estimated time of the next update is used, it is desired that the time used within the base station apparatus 10 and the time used within the terminal apparatus 20 be completely synchronized with each other.

The timer management unit 23 manages the above-described estimated times of next update or the time durations till next update for the contents set by the update information processing unit 24. The beacon receiver 25 is set inactive during a period of time until said content is updated. Here, the "period of time until said content is updated" indicates a period of time during which the beacon containing the notifying identifier needs not be received. Note that this period of time may be set shorter by a predetermined time duration (e.g., 10 seconds or so) in consideration of the time required for connections, displacement in communication time, time required of the beacon receiver 25 for returning to the original state from an inactive state, and so forth.

Where there are a plurality of streams to be received, the update information processing unit 24 sets the nearest time to the estimated times of next update among the plurality of streams. Or the update information processing unit 24 sets the shortest time duration to the time durations till next update thereamong, to the timer management unit 23.

FIG. 6 shows an example of update information, according to the second embodiment of the present invention, which is contained in a connecting identifier and is to be transmitted to the terminal apparatus 20. The update information contains channel, version and estimated time of next update for each channel (stream).

The identifier generator 16 generates a notifying identifier, based on the update information of three channels shown in FIG. 6. More specifically, a time duration till the estimated time of next update is determined based on the estimated time of next update contained in the update information and the current time, and then generates the SSID "Version_01:023:15:30:00_02:013:15:29:20_03:008:17:30:00". The header, namely "Version", indicates that this notifying SSID is a notification about the update information. The subsequent part, namely "01:023:15:30:00", indicates that the channel is 1, the version, namely the number of updates, is 23, and the estimated time of the next update is 15:30:00 (hour/minute/second). "02:013:15:29:20" indicates that the channel is 2, the version is 13 and the estimated time of the next update is 15:29:20 (hour/minute/second). "03:008:17:30:00" indicates that the channel is 3, the version is 8 and the estimated time of the next update is 17:30:00 (hour/minute/second).

If the estimated time of update for the content is contained in the update information contained in the notifying identifier, the estimated time of next update managed by the update information management unit 14 will be directly used for this estimated time of update.

Instead of the estimated time of next update, the time duration till next update may be contained in the update information managed by the update information management unit 14. In such a case, the update information, which varies from hour to hour, is updated and managed by the update information management unit 14. In so doing, the identifier generator 16 can generate notifying identifiers by directly using the update information managed by the update information management unit 14.

If the update information processing unit 24 acquires this update information, it will set 90 seconds or 80 seconds (90-10) in the timer management unit 23, in accordance with the update of channel 2 whose time duration till the next update is shortest.

An operation of the communication system 100 according to the second embodiment will now be described.

Figure 7:
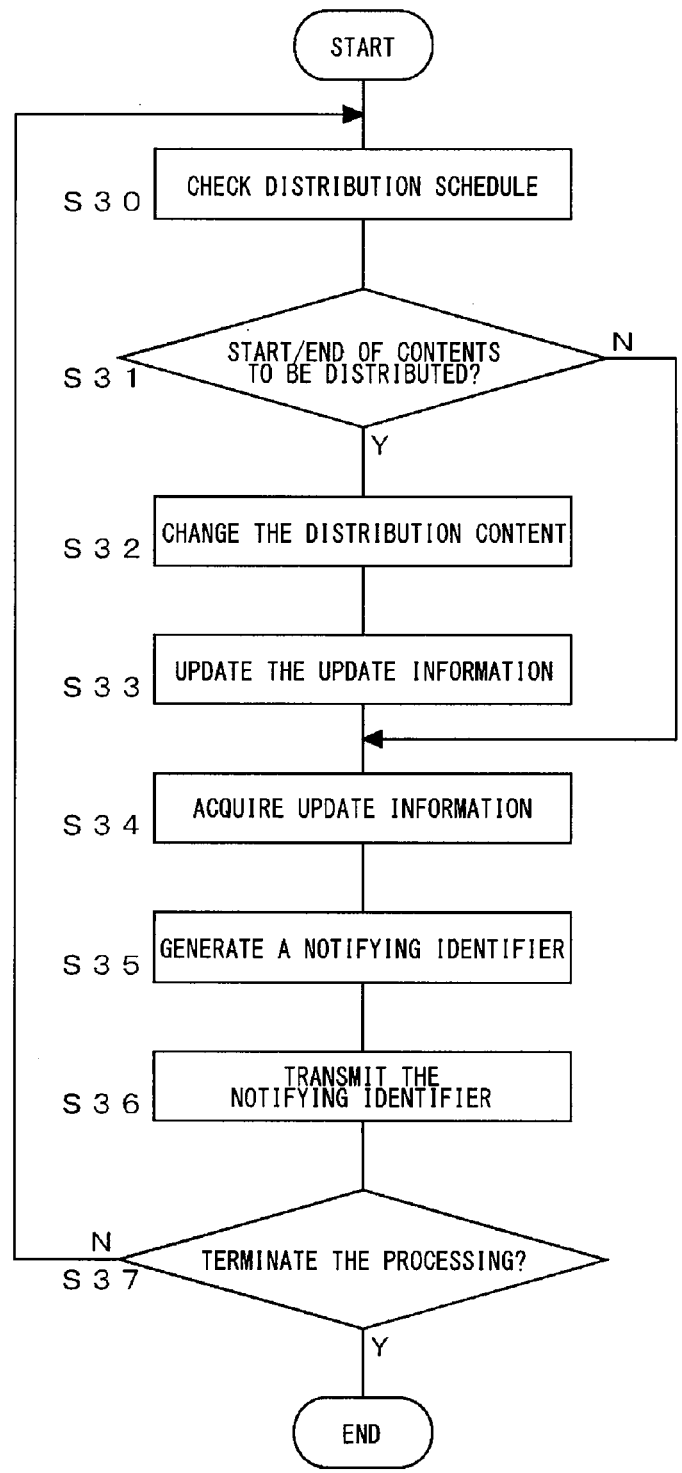
FIG. 7 is a flowchart showing schematically an operation of a base station apparatus according to a second embodiment of the present invention.

FIG. 7 is a flowchart showing schematically an operation of the base station apparatus 10 according to the second embodiment.

The distribution control unit 130 checks a distribution schedule (S30) to determine whether or not there is any stream (channel) that changes a content to be distributed (S31). If there is a stream that changes a content to be distributed (Y of S31), the distribution content will be updated according to the aforementioned distribution schedule (S32) and the update information stored in the update management unit 14 will be updated (S33). If, on the other hand, there is no stream that changes a content to be distributed (N of S31), the processings of Step S32 and Step S33 will be skipped.

The identifier generator 16 acquires the update information stored in the update information management unit 14 (S34) and generates a notifying identifier based on the acquired update information (S35). This update information contains information on the estimated time of the next update or the time duration till the next update. The beacon transmitter 17 transmits the notifying identifier generated by the identifier generator 16, as beacon (S33).

These processings continue by returning repeatedly to Step 30 until the distribution is terminated (Y of S37).

In addition, the base station apparatus 10 transmits the connecting identifier, distributes the contents, performs connection processing between the base station apparatus 10 and terminal apparatuses 20 and also carries out other processings but the description thereof is omitted here.

Figure 8:
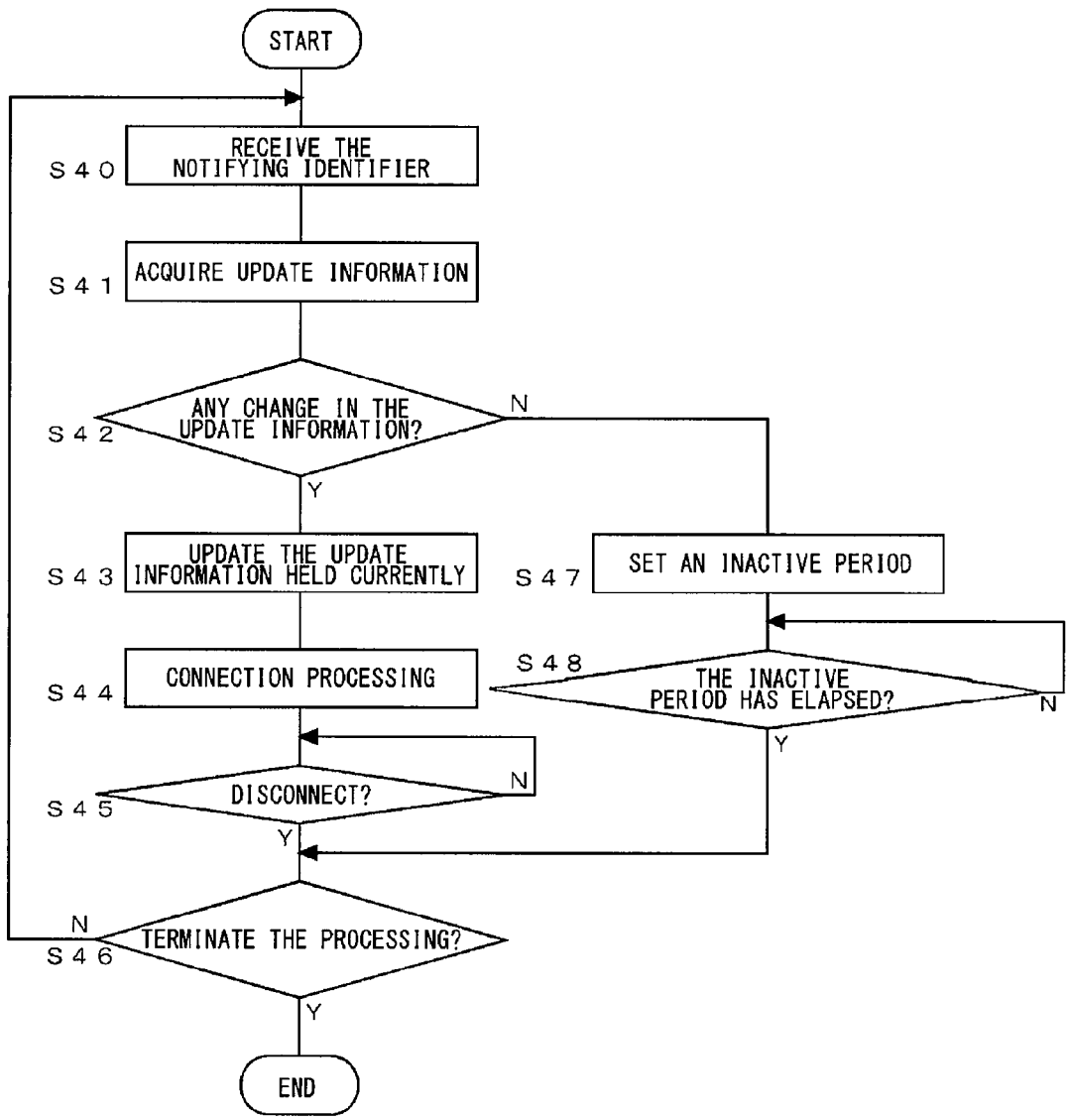
FIG. 8 is a flowchart showing schematically an operation of a terminal apparatus according to a second embodiment of the present invention.

FIG. 8 is a flowchart showing schematically an operation of the terminal apparatus 20 according to the second embodiment of the present invention.

The beacon receiver 25 receives a notifying identifier contained in the beacon (S40). The update information processing unit 24 acquires update information contained in this notifying identifier (S41).

Then the update information processing unit 24 compares the update information contained in this notifying identifier with the update information stored in the update information storage 27 so as to determine whether the content of a channel to be received has been updated or not (S42). More specifically, whether there is any difference in version between both the update information or not is determined. If updated (Y of S42), the update information stored in the update information storage 27 will be updated with the update information received (S43).

The connection processing unit 26 conveys the connecting identifier to the base station apparatus 10 and establishes connection with the base station apparatus 10 (S44). The content receiver 21 receives the contents distributed from the base station apparatus 10. Thereafter, as the connection is discontinued (Y of S45), proceed to Step S46. In Step S46, whether the whole processing is to be terminated or not is determined (S46) and if the processing is not to be terminated (N of S46), the processing of Step 40 onward will be repeated.

In Step 42, if the content is not updated (N of S42), the update information processing unit 24 will set an inactive period of the beacon receiver 25 to the timer management unit 23, based on the estimated time of next update or the time duration till next update contained in the update information (S47). The beacon receiver 25 stays inactive until the inactive period has elapsed (Y of S48). When the inactive period has elapsed, whether the whole processing is to be terminated or not is determined (S46); and if the processing is not to be terminated (N of S46), the processing from Step S40 onward will be repeated.

By employing the above-described second embodiment, the same advantageous effects as those of the first embodiment are achieved. In addition thereto, the beacon receiver 25 is set inactive for a period of time during which the notifying identifier needs not be received. As a result, the power consumed by the beacon receiver 25 can be reduced.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

Figure 9:
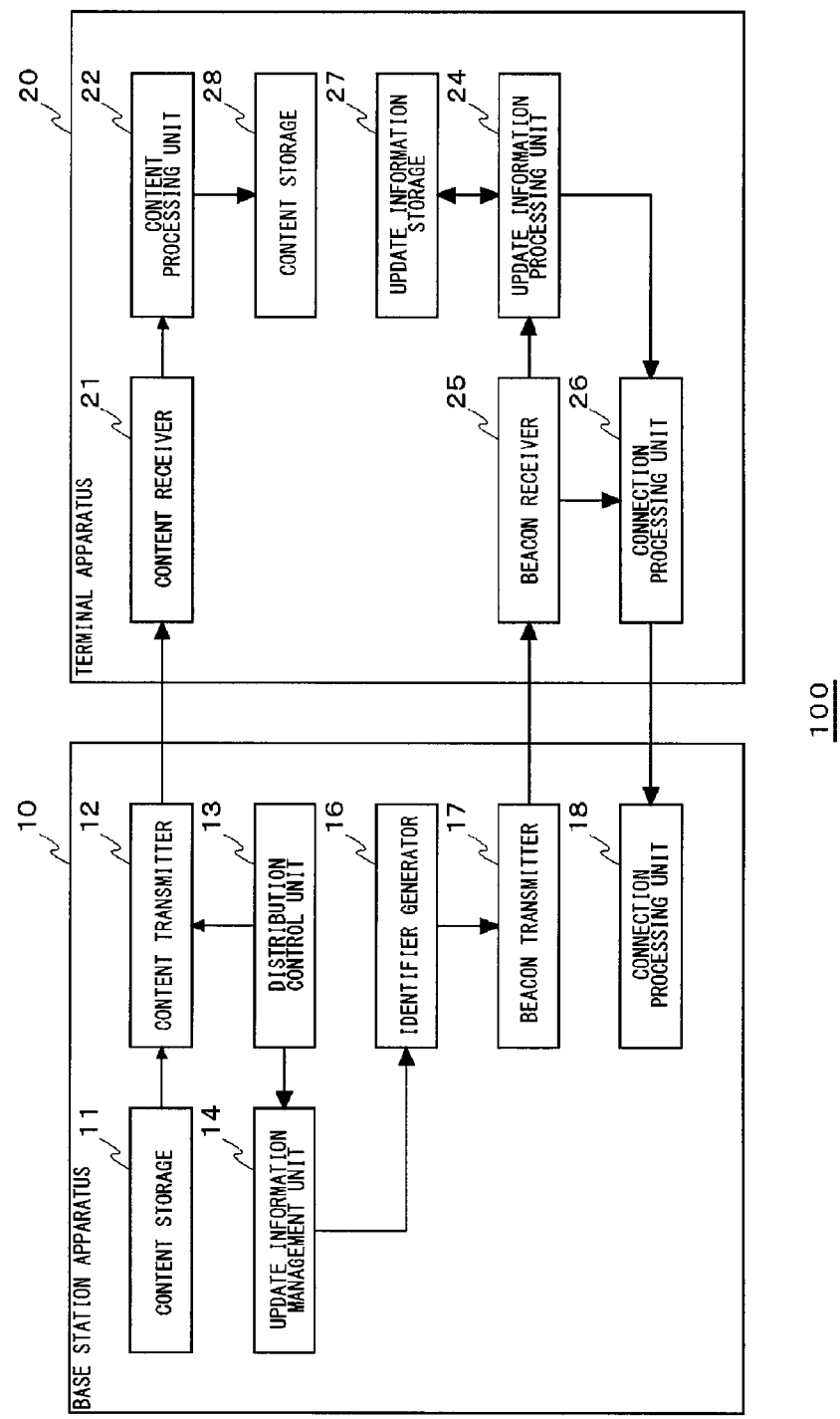
FIG. 9 is a block diagram showing a structure of a communication system according to a modification.

FIG. 9 is a block diagram showing a structure of the communication system 100 according to a modification.

The basic structure and the basic operation of the communication system 100 according to this modification are similar to those of the first and second embodiments. FIG. 9 illustrates an example which is configured based on the communication system 100 according to the first embodiment. Features added to the modification will now be described.

The terminal apparatus 20 has a function to cache the received contents.

The content storage 28 stores partial data of contents received by the content receiver 21.

In the distribution of contents via wireless LAN, there are cases where the entire packets cannot be received due to the loss of packets during transmission and the like. In the light of this, the content processing unit 22 stores partial data of the contents received by the content receiver 21; and when different partial data of the same contents are received for the second time, said partial data and the partial data stored in the content storage 28 are combined together. As a result, more accurate reproduction of contents can be done. Repeating this operation finally allows the reproduction of entire contents using only the partial data stored in the content storage 28. That is, all of partial data required for the reproduction of the entire contents can gather by repeating the above operation.

When this state is achieved, the receiving of partial data of the contents is no longer necessary and therefore the connection processing unit 26 discontinues the connection to the base station apparatus 10. Then the beacon receiving unit 25 receives a notifying identifier contained in the beacon, periodically or with predetermined timing. When all of partial data required for the reproduction of the entire contents have been stored in the content storage 28, the connection processing unit 26 disconnects the connection to the base station 10 and sets the connection state inactive until when a connection request needs to be made. That is, the connection to the base station apparatus 10 is set inactive or kept disconnected until when the distribution content is updated and it is determined by the update information processing unit 24 that a reconnection is necessary. As a result, wasteful connection can be further suppressed.

In the above-described first and second embodiments, the terminal apparatus 20 does not receive beacons while the terminal apparatus 20 is connected to the base station apparatus 10. However, the terminal apparatus 20 may receive beacons while the terminal apparatus 20 is connected to the base station apparatus 10. Thus, even if a distribution content is updated in a stream which is not received currently, such a case can be dealt with. Also, even if the distribution content is updated right after a disconnection and the connection processing is required, this can be grasped beforehand. Hence, wasteful disconnection and connection processing can be eliminated.

While the preferred embodiments of the present invention have been described using specific terms, such description is for illustrative purposes only, and it is to be understood that changes and variations may be further made without departing from the spirit or scope of the appended claims.

What is claimed is:

1. A base station apparatus, comprising:
   a content transmitter which distributes a content, wherein the content is a view content or an audio content;
   an update information management unit which manages update information on the content distributed by said content transmitter;
   an identifier generator which generates a notifying identifier containing the update information managed by said update information management unit; and
   a beacon transmitter which transmits, as beacon, the notifying identifier generated by said identifier generator.

2. A base station apparatus according to claim 1, wherein said content transmitter distributes a plurality of contents in parallel,
   wherein said update information management unit manages identification information used to identify the distribution of each of the plurality of contents and the update information corresponding thereto in such a manner that the identification information is related to the corresponding update information, and
   wherein said identifier generator generates the notifying identifiers by relating a plurality of pieces of identification information to their corresponding update information.

3. A base station apparatus according to claim 2, further comprising: a connection processing unit which performs connection processing between the base station apparatus and a terminal apparatus in response to a connection request sent from the terminal apparatus capable of receiving the content, wherein said connection processing unit rejects a connection request using the notifying identifier generated by said identifier generator and grants a connection request using a connecting identifier which differs from the notifying identifier and which has been set beforehand.

4. A base station apparatus according to claim 1, further comprising: a connection processing unit which performs connection processing between the base station apparatus and a terminal apparatus in response to a connection request sent from the terminal apparatus capable of receiving the content, wherein said connection processing unit rejects a connection request using the notifying identifier generated by said identifier generator and grants a connection request using a connecting identifier which differs from the notifying identifier and which has been set beforehand.

5. A base station apparatus according to claim 1, wherein the content is a streaming content.

6. A base station apparatus, comprising:
a content transmitter which distributes a content, wherein the content is a view content or an audio content;
an update information management unit which manages update information on the content distributed by said content transmitter;
an identifier generator which generates a notifying identifier containing the update information managed by said update information management unit; and
a beacon transmitter which transmits, as beacon, the notifying identifier generated by said identifier generator,
wherein the update information contains update time of the content or time duration until the content is updated.

7. A base station apparatus according to claim 6, wherein said content transmitter distributes a plurality of contents in parallel, wherein said update information management unit manages identification information used to identify the distribution of each of the plurality of contents and the update information corresponding thereto in such a manner that the identification information is related to the corresponding update information, and wherein said identifier generator generates the notifying identifiers by relating a plurality of pieces of identification information to their corresponding update information.

8. A base station apparatus according to claim 7, further comprising: a connection processing unit which performs connection processing between the base station apparatus and a terminal apparatus in response to a connection request sent from the terminal apparatus capable of receiving the content, wherein said connection processing unit rejects a connection request using the notifying identifier generated by said identifier generator and grants a connection request using a connecting identifier which differs from the notifying identifier and which has been set beforehand.

9. A base station apparatus according to claim 6, further comprising: a connection processing unit which performs connection processing between the base station apparatus and a terminal apparatus in response to a connection request sent from the terminal apparatus capable of receiving the content, wherein said connection processing unit rejects a connection request using the notifying identifier generated by said identifier generator and grants a connection request using a connecting identifier which differs from the notifying identifier and which has been set beforehand.

10. A base station apparatus according to claim 6, wherein the content is a streaming content.

* * * * *